(12) United States Patent
Bispo et al.

(10) Patent No.: US 12,393,414 B2
(45) Date of Patent: Aug. 19, 2025

(54) SYSTEM AND METHOD FOR STATISTICALLY DISTRIBUTED RATE LIMITING OF APPLICATION PROGRAMMING INTERFACE TRAFFIC

(71) Applicant: Salesforce, Inc., San Francisco, CA (US)

(72) Inventors: Mariano De Sousa Bispo, Buenos Aires (AR); Tomas Bruno, Buenos Aires (AZ); Javier Atadia, Beunos Aires (AR)

(73) Assignee: Salesforce, Inc., San Francisco, CA (US)

( * ) Notice: Subject to any disclaimer, the term of this patent is extended or adjusted under 35 U.S.C. 154(b) by 303 days.

(21) Appl. No.: 17/949,133

(22) Filed: Sep. 20, 2022

(65) Prior Publication Data
US 2023/0088768 A1     Mar. 23, 2023

Related U.S. Application Data

(60) Provisional application No. 63/246,137, filed on Sep. 20, 2021.

(51) Int. Cl.
| | |
|---|---|
| *G06F 9/54* | (2006.01) |
| *G06F 8/10* | (2018.01) |
| *G06F 8/36* | (2018.01) |
| *G06F 8/41* | (2018.01) |
| *G06F 8/65* | (2018.01) |
| *G06F 8/71* | (2018.01) |

(Continued)

(52) U.S. Cl.
CPC ............. *G06F 8/65* (2013.01); *G06F 8/10* (2013.01); *G06F 8/36* (2013.01); *G06F 8/423* (2013.01); *G06F 8/457* (2013.01); *G06F 8/71* (2013.01); *G06F 9/541* (2013.01); *G06F 9/547* (2013.01); *G06F 21/6218* (2013.01); *H04L 47/22* (2013.01); *H04L 63/029* (2013.01); *H04L 63/1458* (2013.01); *H04L 63/20* (2013.01)

(58) Field of Classification Search
CPC ........................... H04L 47/22; H04L 41/0896
See application file for complete search history.

(56) References Cited

U.S. PATENT DOCUMENTS

| | | | | |
|---|---|---|---|---|
| 11,347,550 B1* | 5/2022 | Harjono | ............... | G06F 9/5077 |
| 2018/0343083 A1* | 11/2018 | Teboulle | ............... | H04W 88/16 |

\* cited by examiner

*Primary Examiner* — Emmanuel L Moise
*Assistant Examiner* — Xiang Yu
(74) *Attorney, Agent, or Firm* — Sterne, Kessler, Goldstein & Fox P.L.L.C.

(57) ABSTRACT

Disclosed herein are system, method, and computer program product embodiments for implementing statistical distributed rate limiting in an Application Programming Interfaces (API) Gateway cluster. An API Gateway cluster may comprise a plurality of gateway nodes and manage API traffic to ensure proper function and protect the health of an API. Each gateway node may use a distributed rate limiting algorithm based on the physics formulas for average velocity, average acceleration and distance based on time determine the total number of API requests accepted by all the nodes in the cluster. Implementation of statistical distributed rate limiting allows for accurate estimations of the total requests accepted by cluster without requiring each node to share its status with the other nodes in the cluster upon receiving each API request. This approach allows for minimum computational overhead while prioritizing the health of the API.

19 Claims, 4 Drawing Sheets

(51) Int. Cl.
*G06F 21/62* (2013.01)
*H04L 9/40* (2022.01)
*H04L 47/22* (2022.01)

US 12,393,414 B2

SYSTEM AND METHOD FOR STATISTICALLY DISTRIBUTED RATE LIMITING OF APPLICATION PROGRAMMING INTERFACE TRAFFIC

CROSS-REFERENCE TO RELATED APPLICATIONS

This application claims the benefit of U.S. Provisional Patent Application No. 63/246,137, filed Sep. 20, 2022 entitled "Enterprise Management Functionality in an Application Programming Interface Gateway," which is incorporated by reference herein in its entirety.

BACKGROUND

One or more implementations relate to the field of Application Programming Interfaces (APIs), and more specifically to application of API traffic rate limiting policies.

As connectivity between mobile devices and other computing platforms continues to develop, application have been developed that communicate and share information. Commonly, applications may communicate via an Application Programming Interface (API). An API is a software interface offering a service to other programs to communicate data. APIs may have several different components, such as specifications, markdown documents, etc. that constitute part of an API's development.

An API Gateway is an API management tool that sits between API clients and backend services, transmitting API requests from clients to appropriate services provided by API endpoints and transmitting API responses back to clients for requested services. API Gateways may be used to manage API request traffic in order to ensure that the internal resources (e.g., servers, databases, etc.) have capacity to handle the request and are not overloaded. This functionality may be implemented using a rate limiting policy that defines the number of request an API may allow in a specific time window. In order to implement rat limiting policies, API Gateways may need to continuously communicate the status of internal resources with other API Gateways within a cluster. This can introduce costly computational overhead and thus greatly increase latency. Accordingly, improvements to the implementation of rate limiting policies in API Gateways are needed in order to provide improved performance and functionality to end users and service providers alike.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
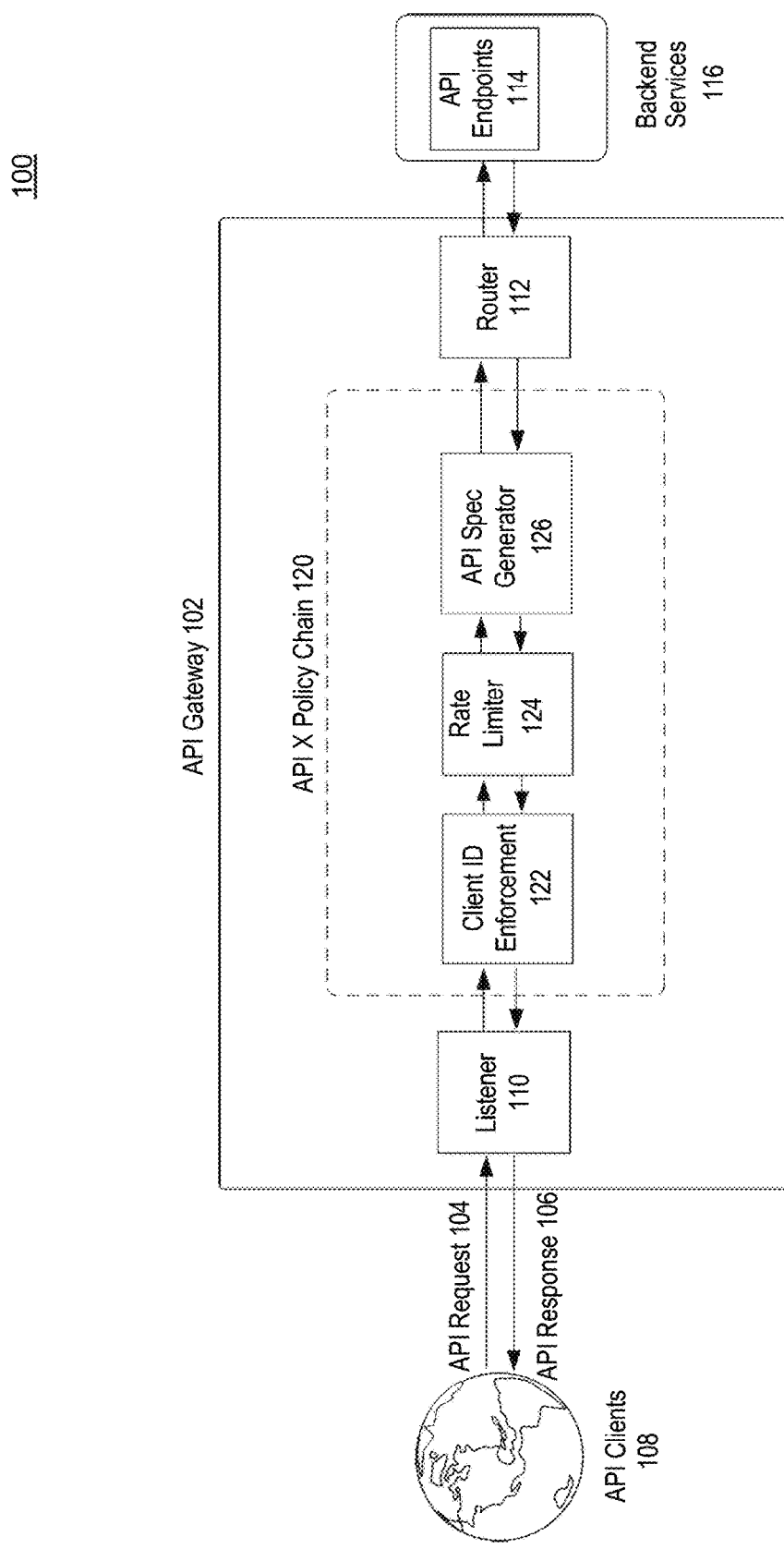
FIG. 1 illustrates a block diagram of an Application Programming Interface (API) environment, according to some embodiments.

Provided herein are system, apparatus, device, method and/or computer program product embodiments, and/or combinations and sub-combinations thereof, for implementing statistical distributed rate limiting for gateways in an API environment.

An Application Programming Interface (API) offers an interface through which applications can access backend services. API clients access backend services by making API requests. An API may run on multiple servers, allowing horizontal scaling. Depending on the architecture the company chooses, each server may receive different amounts of traffic, though the API continues to be seen as a single entity. This is because the API does not have insight into how many servers are servicing it's API requests. These servers may in turn utilize other backend resources such as databases to fulfill API requests from API clients. The backend resources that receive and process API requests have a limit as to the number of API requests they can handle without adverse side effects to the health and functionality of the API. Therefore, policies that limit the number API requests allowed in a specified time window need to be implemented.

In addition to backend servers and databases, an API environment may also include an API Gateway. An API Gateway is an API management tool provided between applications that utilize an API and backend services. An API Gateway may facilitate the transmitting of API requests from client applications to the appropriate backend services provided by API endpoints, as well as the transmitting of API responses back to client applications for the requested services. Another function of an API Gateway may be to manage API traffic in order to protect the health of an API and ensure proper function by ensuring that every backend resource (e.g., servers, databases, etc.) has capacity to serve each request. Typically, this is achieved by implementing a rate limiting policy, which defines how many requests an API will allow in a specific time window (e.g., for the Orders API, allow a maximum of 1000 requests per minute).

For example, an API Gateway and rate limiting policy may be deployed to manage API traffic for a particular API that may be serviced by several backend servers. The API Gateway may be configured as a gateway cluster comprising several API Gateway nodes and each API Gateway node may correspond to a backend server. The rate limiting policy may indicate that the API will only allow a maximum of 1000 requests per minute. As the rate limit applies to the API as a whole (not individual servers) and the API requests are distributed across the multiple servers, the gateway cluster needs to keep track of the number of API requests each server is handling in order to ensure that the rate limit is not exceeded. This requires the different API Gateway nodes to communicate with each other such that each API Gateway node is aware of the status of every other active node in the cluster at any given point. This can result in costly computational overhead leading to increased latency.

One solution may be to estimate the number of API requests each server may be handling based the types of requests the server handles and the general traffic patterns for the API. However, this approach is likely to result in highly inaccurate results. This is because the shape of the API traffic may vary over time depending on the needs of each consumer of the API and thus the distribution of requests across the different servers may also vary over time.

Alternatively, each API Gateway node may send its current status to the other active nodes in the cluster at a specific sampling frequency. Each API Gateway node may then use the most recently received status for the other active API Gateway nodes to calculate locally the total number of requests the gateway cluster has handled in the last minute. This allows each node to check whether the cluster has exceeded the request threshold set by the rate limiting policy. For this approach, the API Gateway nodes may be configured to send their status at a sampling frequency that is greater than once per minute ensuring that the status of each API Gateway node is shared with the cluster at least once per minute. This solution allows for an organization to optimize for accuracy and/or to minimize computational overhead by adjusting the sampling frequency.

FIG. 1 illustrates a block diagram of an API environment, according to some embodiments. API environment 100 may include API Gateway 102, API clients 108, and backend services 116. API clients 108 may be applications that utilize the API of API environment 100 to access backend services 116. API client 108 may send API request 104 comprising a unique Uniform Resource Location (URL) identifying an API endpoint 114. API request 104 may also include information required by API endpoint 114 to fulfill the request (e.g., a query, client identification information, etc.). If API request 104 is allowed and processed by API endpoint 114, API client 108 may receive API response 106.

API Gateway 102 may sit between API clients 108 and backend services 116 and serve a variety of functions that facilitate management of API environment 100 such as authentication, routing, rate limiting, monitoring, analytics, policies, etc. API Gateway 102 may include listener 110 and router 112 to receive and route API request 104 to the proper API endpoint 114 in backend services 116. Additionally, API Gateway 102 may implement one or more API policy chains corresponding to one or more APIs to enforce policies for the one or more APIs. An API policy may be a set of rules that are enforced by API Gateway 110. In some embodiments, some API policies may allow or block access to APIs based on an IP address of the client application in API clients 106, while others may allow or restrict access to specific resources provided by an API. Some API policies may enable controlling the rate at which API requests are made to a backend API. Further, an API policy may be an out-of-the-box policy defined by an API gateway provider or a custom policy defined by a customer using API Gateway 102.

As shown in FIG. 1, API Gateway 102 may implement API X policy chain 120 corresponding to API X and comprising client ID enforcement 122, rate limiter 124, and API specification generator 126. In some embodiments, client ID enforcement 122 may validate clients before allowing access to backend services 116. In some embodiments, API specification generator 126 may be implemented in API Gateway 102 to generate API specifications for API X.

In some embodiments, rate limiter 124 may serve to protect API X from overload due to service attacks or excessive traffic. Rate limiter 124 may do this by limiting the number of API requests 104 to API X allowed to be processed by backend services 116 within a specific time window. For example, API X may have a rate liming policy that indicates API X will only allow a maximum of 1500 requests per minute. If API Gateway 102 receives an API request 104 and determines that the request is the 1501$^{st}$ request within the last minute, rate limiter 124 may deny API request 104.

In some embodiments, rate limiter 124 may also implement a rate limiting policy that includes an acceleration rate threshold. For example, the rate limiting policy for API X may indicate that API X will not allow an acceleration rate greater than 20 requests per minute squared. If the rate of API requests 104 per minute increases at an acceleration rate greater than 20 requests per minute squared, it may indicate an attack. Therefore, API Gateway 102 may implement API protection protocols indicated by the rate limiting policy of API X. An example of an API protection protocol may include API Gateway 102 denying all API requests 104 to API X until a safe APR request rate is detected.

In order to allow for horizontal scalability and reliability, an API Gateway may be implemented in a cluster configuration. An API Gateway cluster may comprise several API Gateway nodes. Each API Gateway node may include all the API Gateway components including UI, the API Gateway package and an Internal Data Store instance for storing assets.

Figure 2:
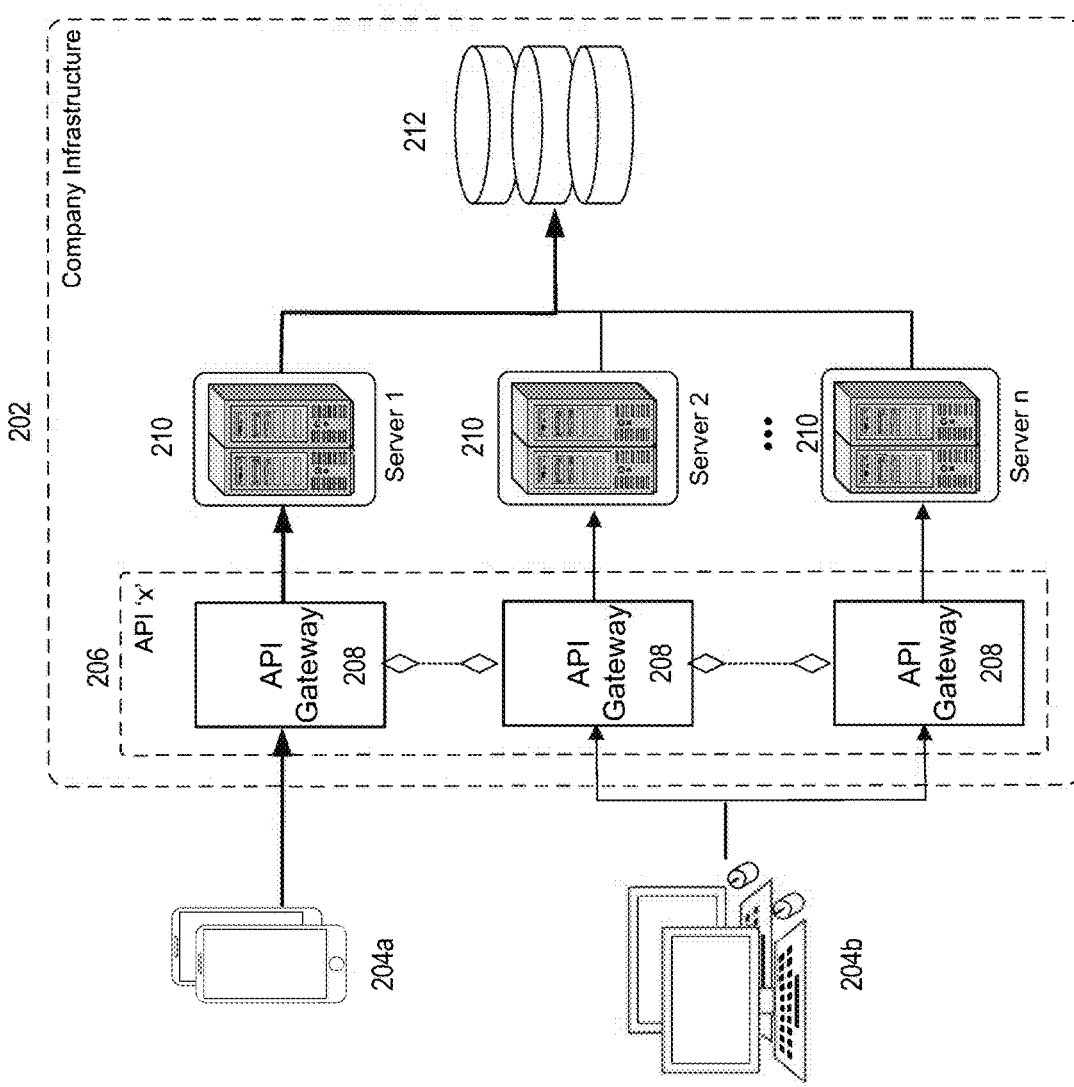
FIG. 2 illustrates a block diagram of an exemplary implementation of an API Gateway cluster configuration in an API environment, according to some embodiments.

FIG. 2 illustrates a block diagram of an exemplary implementation of an API Gateway cluster configuration in an API environment, according to some embodiments. As shown in FIG. 2, API Gateway cluster 206 protects API X and the resources that provide the backend services that may be accessed via API X. The resources may include servers 210 and database 212. Gateway cluster 206 may comprise several API Gateway nodes 208 corresponding to servers 210.

In some embodiments, API clients 204a and 204b may send API requests to API X to access backend resources provided by servers 210. Each of the API requests may be received by an API Gateway node 208. As described above an API Gateway 208 may serve multiple functions including authentication, routing, rate limiting, monitoring, analytics, policies, etc. Each API Gateway node also performs these same services. However, instead of one gateway performing these functions for the whole API, each gateway node 208 serves a server 210. This allows for more reliable horizontal scalability. However, configuring an API Gateway this way also creates some challenges.

As described above, a key function of an API Gateway is implementation of rate limiting policies for an API. In a non-clustered configuration (as depicted in FIG. 1), all API requests for an API are routed through the single API Gateway. As such, the gateway has full insight to the rate of API requests being received by the API and thus can apply the API's rate limiting policy with no need for additional information. However, in an API Gateway cluster, API requests are routed through multiple gateway nodes 208. Accordingly, each gateway node 208 only has insight into the number of API requests it receives. This poses a problem because distributed rate limiting requires the ability to count request at cluster level, not at a node level. The solution to this problem may be to have gateway nodes 208 share their status with one another.

Typical implementations for distributed rate limiting require each node to be in sync with every other node on each request. With this approach, accountability is preserved, though throughput is extremely penalized. For educational purposes only, it is possible to understand the performance penalty of having to synchronize data between nodes, as having to go to main memory instead of relying on the CPU cache: latency is increased by several orders of magnitude.

Embodiments herein provide are a method, system and computer program product for implementing statistical distributed rate limiting within an API Gateway cluster in order to minimize computational overhead, while maintaining a high level of accuracy. Statistical distributed rate limiting uses a distributed rate limiting algorithm that does not penalize throughput, and focuses on preserving the healthiness of the components in the infrastructure. This distributed rate limiting algorithm allows for the decision of allowing/rejecting a request to be made exclusively in the node, locally, without any synchronization to the rest of the cluster.

In order to implement statistical distributed rate limiting, each gateway node 208 may share its status across the nodes of cluster 206 at a predetermined time interval. Gateway cluster 206 may use a distributed memory such as Redis to facilitate sharing data across the nodes of the cluster. Each API Gateway node 208 may be initialized within cluster 206 by first identifying itself to the distributed memory. Additionally, each node 208 may sync its clock to that of the other nodes in gateway cluster 206.

As noted above, in some embodiments, gateway nodes 208 may share their status across the nodes of gateway cluster 206 at a predetermined time interval as opposed to synchronizing upon receipt of each API request. The time interval at which gateway nodes 208 may share their status may be defined during initialization of gateway nodes 208. The time interval may be any time interval shorter than the time window of the rate limiting for the API. For example, if rate limiting policy for API X indicates a limit of 1000 requests per minute, the time interval may be 2 seconds. In other words, the sampling frequency for the status of gateway nodes 208 is once every 2 seconds.

In embodiments, a statistical distributed rate limiting algorithm is based on three formulas with corollaries in physics:

i. the formula for average velocity (e.g., representative of a current request processing rate)

ii. the formula for average acceleration (e.g., representative of a change in request processing rate over time); and iii. the formula for distance based on time (e.g., representative of a total number of requests processed over a period of time).

The formula for average request processing rate (average velocity) may be used to calculate the rate of API requests processed by a gateway node 208 during a particular time window.

$$\bar{v} = \frac{\Delta x}{\Delta t}$$

$\bar{v}$ average request processing rate
$\Delta x$ number of requests processed
$\Delta t$ time window Continuing with the example above where the distributed rate limit for API X is 1000 requests per minute, gateway node 208 may calculate its current request processing rate using the formula above. The number of requests processed, $\Delta x$, for gateway node 208 may be given by the number of requests the node has processed in the last window $\Delta t$. In embodiments, the time window $\Delta t$ may be any suitable time period small enough to sufficiently monitor the processing for purposes of the rate limiting window. In an embodiment, the time window $\Delta t$ is 2 seconds. This velocity equation provides an indication of the instantaneous rate of processing by the gateway node 208 (e.g., the number of requests the gateway node is processing per unit time).

The formula for average change in request processing rate over time (average acceleration) may be used to calculate the change in the request processing rate of by a gateway node 208 during a particular time window.

$$\bar{a} = \frac{v - v_0}{\Delta t} = \frac{\Delta v}{\Delta t}$$

$\bar{a}$ average change in request processing rate over time
$v$ current request processing rate
$v_0$ starting request processing rate
$\Delta t$ time window Gateway node 208 may calculate the change in its request processing rate over time using the formula above. The current request processing rate $v$ may the request processing rate calculated above, while the starting request processing rate may be $v_0$ may be the request processing rate for the time window immediately before the current time window. In the example above where the time window $\Delta t$ is 2 seconds, the starting request processing rate $v_0$ may be the request processing rate calculated for the 2-second time window immediately prior to the current 2-second time window. This acceleration equation provides an indication of the instantaneous rate of change of request processing by the gateway node 208 (e.g., the change over time in the number of requests the gateway node is processing per unit time).

The formula for requests processed over time (distance based on time) may be used to calculate the number of API requests processed by each node 208 during the rate limiting time.

$$s(t) = s_0 + v_0 t + \frac{1}{2}at^2 = s_0 + \frac{v_0 + v(t)}{2}t$$

$s(t)$ number of requests processed in t time
$t$ rate limiting time

Gateway node 208 may calculate the total number of requests processed by all the nodes in gateway cluster 206 over a period of time using the formula above. In embodiments, the period of time t used to calculate the number of requests processed by gateway cluster 206 may be the rate limiting time defined by the distributed rate limiting policy for the API. The total number of requests processed during the rate limiting time for gateway cluster 206 may be given by the sum of the number of requests processed by each node 208 in the cluster over the same rate limiting time. If the sum of the requests processed by the gateway nodes 208 over the rate limiting time is less than or equal to the distributed quota defined in the rate limiting policy for API X, the request is allowed, otherwise it is rejected.

In the example above, where the distributed rate limit for API X is 1000 requests per minute, t may be equal to 60 seconds (one minute) and the distribution quota for the rate limiting time may be 1000 requests. Accordingly, if the sum of the requests processed by all the gateway nodes 208 in gateway cluster 206 (total number of requests processed by gateway cluster 206) during the last 60 seconds is less than or equal to the distributed quota of 1000 requests, gateway node 208 may allow the request. Alternatively, if the total number of requests processed by gateway cluster 206 during the last 60 seconds is greater than 1000 requests, gateway node 208 may deny the request until the total number of requests processed by gateway cluster 206 in the last 60 seconds decreases such that it is less than or equal to 1000.

In some embodiments, an API Gateway node 208 may use its calculated acceleration to infer whether API X is under high stress or under attack. Steep acceleration values often indicate that a node may be under attack or high stress. A node may report the high acceleration rate to the distributed memory. However, the other nodes in the cluster may still be between sampling windows and thus may not be able to act on the information. In such cases, the algorithm may be configured to detect whether any node has exceeded a predetermined acceleration threshold. Additionally, the algorithm may be configured to notify the customer and/or implement API protection protocols. In some embodiments, the algorithm may infer that the API is under attack and therefore every other node in the cluster is also under stress. In this scenario, the acceleration of the node under attack may override the acceleration of the other nodes in the cluster. Accordingly, API traffic for every node in the cluster may be denied until acceleration decreases.

Figure 3:
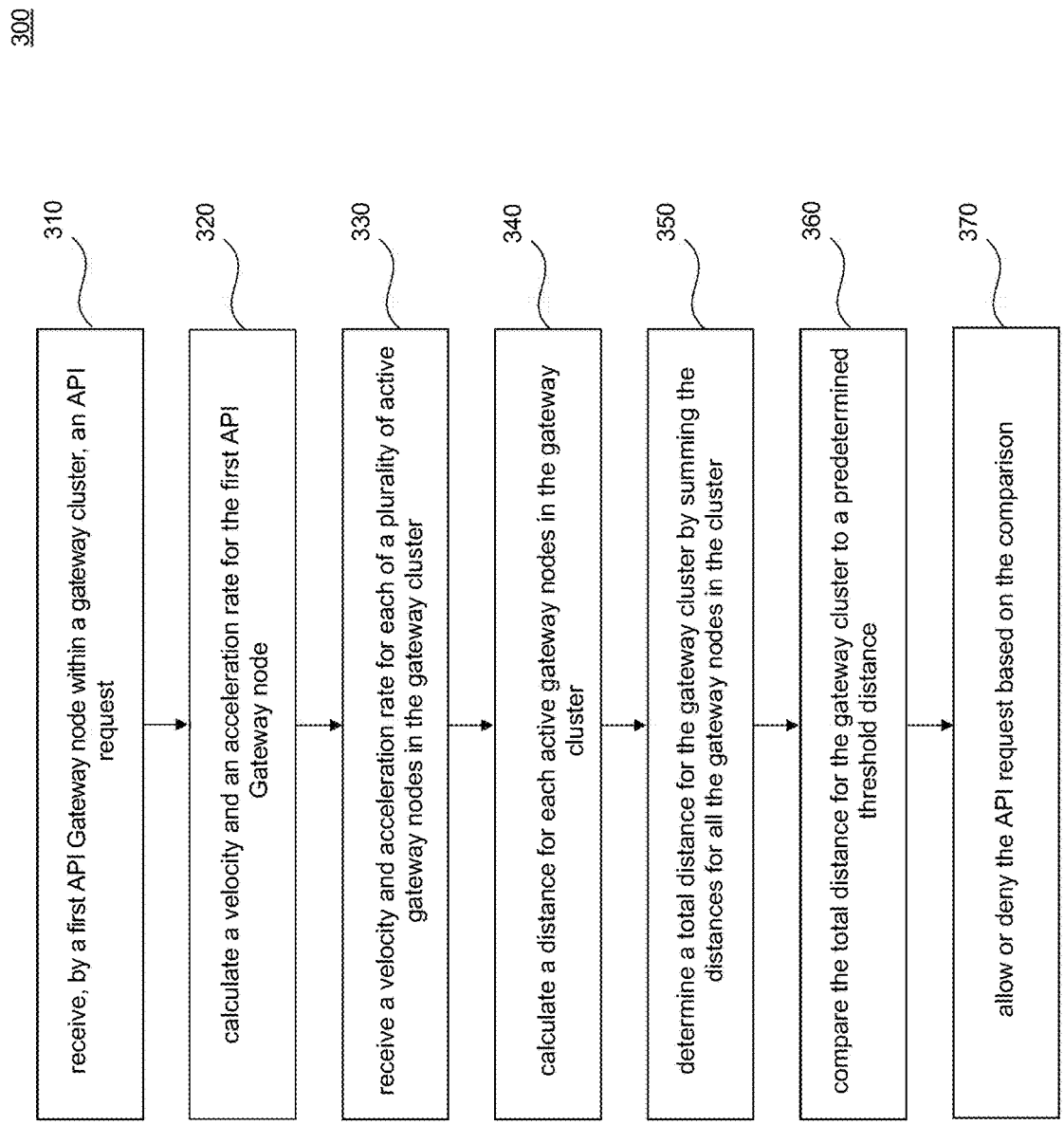
FIG. 3 illustrates a flowchart diagram of an exemplary method for implementing statistical distributed rate limiting within an API Gateway cluster, according to some embodiments.

FIG. 3 illustrates a flowchart diagram of an exemplary method for implementing statistical distributed rate limiting within an API Gateway cluster, according to some embodiments. Method 300 may be performed by processing logic that may include hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, the steps in method 300 may not need to be performed in the exact order shown, as will be understood by a person of ordinary skill in the art. Accordingly, the scope of the invention should not be considered limited to the specific arrangement of steps shown in FIG. 3. Method 300 shall be described with reference to FIGS. 1 and 2. However, method 300 is not limited to that example embodiment.

At 310, an API Gateway node 208 in gateway cluster 206 may receive an API request from an API client 204. At 320, gateway node 208 may calculate a velocity and an acceleration rate using the formulas for average velocity (e.g., representative of the current request processing rate) and average acceleration (e.g., representative of a change in request processing rate over time). For the velocity formula, $\Delta x$ may be equal to the number of API requests processed by gateway node 208 during $\Delta t$, which may be a suitable time period small enough to sufficiently monitor the processing for purposes of the rate limiting window for gateway cluster 206. Similarly, for the acceleration formula, may be equal to the difference between the current velocity and the velocity calculated at to. Gateway node 208 may calculate and update its internal velocity and acceleration on receipt of each API request.

In some embodiments, gateway node 208 may asynchronously share its status to the distributed memory for gateway cluster 206. The status shared by gateway node 208 may comprise the latest velocity and acceleration values calculated for gateway node 208. Gateway node 208 may have a predetermined sampling frequency at which gateway node 208 may share its status to the distributed memory and thus across the nodes of gateway cluster 206.

At 330, gateway node 208 may retrieve a velocity and acceleration for each alive node in gateway cluster 206 from the distributed memory. Gateway node 208 may determine if a node in gateway cluster 206 is alive by determining whether a velocity or acceleration has been shared for the node in the last 'y' time period. If no velocity or acceleration has been shared, gateway node 208 may determine that the node is likely offline, and thus should be removed from the distributed distance equation. Gateway node 208 may retrieve the velocities and acceleration rates for the active nodes in gateway cluster 206 at the predetermined sampling frequency determined when the node is first initialized into cluster 206.

At 340, gateway node 208 may calculate a distance (e.g., representative of a total number of requests processed over a period of time) for each active node in gateway cluster 206, including itself, using the formula for distance based on time described above. At 350, gateway node 208 may then calculate an estimated total distance for gateway cluster 206 by summing the calculated number of requests processed for all the active nodes in gateway cluster 206. As noted above, the total number of requests processed by gateway cluster 206 is equal to the number of API requests processed by all the active nodes in gateway cluster 206 during the rate limiting policy time window for the API. Gateway node 208 may calculate and update its own distance internally upon receipt of each API request. Gateway node 208 may also calculate the number of requests processed during the rate limiting time for the gateway cluster upon receipt of each API request. However, it may only calculate the number of requests processed for the other active nodes in cluster 206 upon retrieval of updated velocities and acceleration rates for the other nodes from the distributed memory.

At 360, gateway node 208 may compare the total number of requests processed during the rate limiting time for gateway cluster 206 calculated at 350 with the distributed quota defined in the rate limiting policy for the API. If the distance is less than or equal to the distributed quota, gateway node 208 may determine that gateway cluster 206 has not exceeded the distributed quota. Alternatively, if the total number of requests processed is greater than the distributed quota, gateway node 208 may determine that gateway cluster 206 has exceeded the distributed quota.

At 370, gateway node 208 may allow or deny the API request based on the comparison done at 360. If the result of the comparison is that gateway cluster 206 has not exceeded its distributed quota, gateway node 208 may allow the API request. Alternatively, if the result indicates that gateway cluster 206 has exceeded its distributed quota, gateway node 208 may deny the API request. Additionally, gateway node 208 may continue to deny subsequent API requests until the total number of requests processed by gateway cluster 206 during the rate limiting time for the API is less than or equal to the distributed quota for the cluster.

Figure 4:
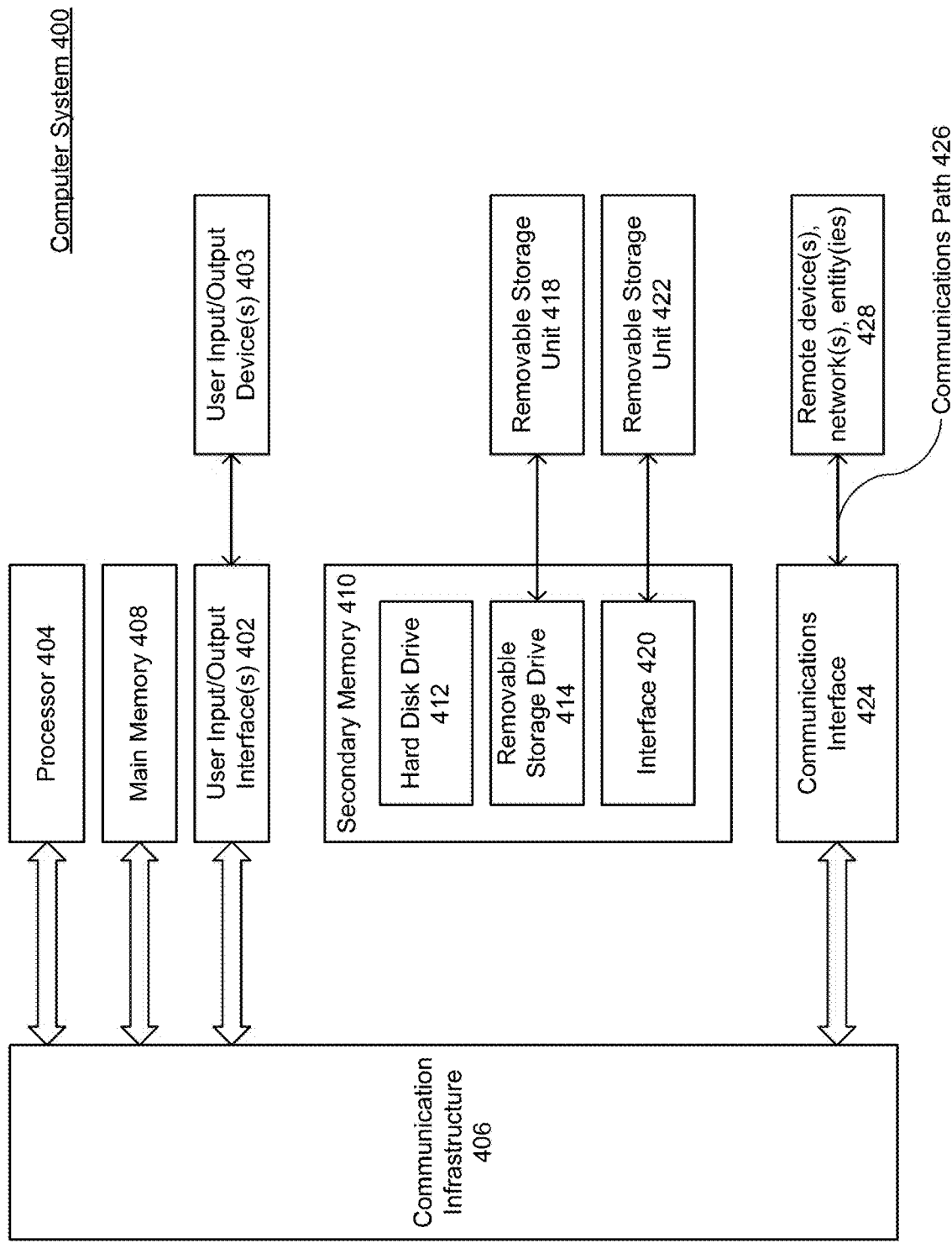
FIG. 4 depicts an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include customer input/output device(s) 403, such as monitors, keyboards, pointing devices, etc., which may communicate with communication infrastructure 406 through customer input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random-access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 44. Removable storage drive 44 may be a floppy disk drive, a magnetic tape drive, a compact disk drive, an optical storage device, tape backup device, and/or any other storage device/drive.

Removable storage drive 414 may interact with a removable storage unit 418.

Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 44 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method for distributed rate limiting of application programming interface (API) requests in an API environment over a period of time, comprising:
    calculating, upon receipt of an API request by a first active gateway node within a gateway cluster having a plurality of active gateway nodes, a first velocity and a first acceleration rate of a first subset of the API requests distributed to the first active gateway node;
    calculating, by the first active gateway node, a total distance for the plurality of active gateway nodes in the gateway cluster by at least summing a first distance for the first active gateway node based on the first velocity and the first acceleration rate with a second distance based on a second velocity and a second acceleration rate of a second subset of the API requests distributed to at least one remaining active gateway node in the gateway cluster; and;
    allowing or denying, by the first active gateway node, the API request to be processed based on determination comparison of the total distance to a predetermined threshold distance; and
    transmitting, to the at least one of the remaining active gateway nodes in the gateway cluster by the first active gateway node, the first velocity and the first acceleration rate of the first subset of the API requests,
        wherein the first velocity and the first acceleration rate of the first subset of the API requests are usable, by the at least one of the remaining active gateway nodes in the gateway cluster, to allow or deny another API request to be processed.

2. The method of claim 1, wherein the total distance for the gateway cluster is indicative of the total number of API requests processed by the plurality of active gateway nodes in the gateway cluster during a specified time window, and
    wherein the predetermined threshold distance is a distributed quota for the gateway cluster determined by a rate limiting policy defining how many API requests can be processed by resources in the API environment during the specified time window.

3. The method of claim 1, wherein the calculated first velocity is indicative of a rate of the first subset of the API requests received by the first active gateway node over the period of time.

4. The method of claim 1, wherein the calculated first acceleration rate of the first subset of the API requests is indicative of a change in the first velocity of the first subset of the API requests received by the first active gateway node over the period of time.

5. The method of claim 1, further comprising:
    asynchronously sending the first velocity and the first acceleration rate of the first subset of the API requests distributed to the first active gateway node to the at least one of the remaining active gateway nodes in the gateway cluster,
        wherein sending and receiving velocity and acceleration data occurs at a predefined frequency that is shorter than a specified time window for a rate limiting policy of the gateway cluster.

6. The method of claim 1, wherein the first active gateway node is configured to deny the API request if the total distance for the gateway cluster is greater than the predetermined threshold distance.

7. The method of claim 1, wherein the gateway cluster is determined to be under stress if the first acceleration rate of the first subset of the API requests distributed to the first active gateway node exceeds a predetermined acceleration threshold.

8. The method of claim 7, wherein the gateway cluster is configured to deny the API requests for the plurality of active gateway nodes in the gateway cluster when the gateway cluster is determined to be under stress.

9. The method of claim 1, wherein the gateway cluster comprises a plurality of gateway nodes and protects a set of resources in the API environment, and
    wherein a distributed memory is used to share data across the plurality of active gateway nodes in the gateway cluster.

10. A system comprising:
    a memory; and
    at least one processor coupled to the memory and configured to:
        calculate, upon receipt of an application programming interface (API) request by a first active gateway node within a gateway cluster having a plurality of active gateway nodes, a first velocity and a first acceleration rate of a first subset of API requests distributed to the first active gateway node;
        calculate, by the first active gateway node, a total distance for the plurality of active gateway nodes in the gateway cluster by at least summing a first distance for the first active gateway node based on the first velocity and the first acceleration rate with a second distance based on a second velocity and a second acceleration rate of a second subset of the API requests distributed to at least one remaining active gateway node in the gateway cluster; and
        allow or deny, by the first active gateway node, the API request to be processed based on determination comparison of the total distance to a predetermined threshold distance; and
        transmit, to the at least one of the remaining active gateway nodes in the gateway cluster by the first active gateway node, the first velocity and the first acceleration rate of the API requests associated with the first active gateway node,
            wherein the first velocity and the first acceleration rate of the first subset of the API requests are usable, by the at least one of the remaining active gateway nodes in the gateway cluster, to allow or deny another API request to be processed.

11. The system of claim 10, wherein the total distance for the gateway cluster is indicative of the total number of API requests processed by the plurality of active gateway nodes in the gateway cluster during a specified time window, and
wherein the predetermined threshold distance is a distributed quota for the gateway cluster determined by a rate limiting policy defining how many API requests can be processed by resources in an API environment during the specified time window.

12. The system of claim 10, wherein the calculated first velocity is indicative of a rate of the first subset of the API requests received by the first active gateway node over a period of time, and
wherein the calculated first acceleration rate of the first subset of the API requests is indicative of a change in the first velocity of the first subset of the API requests received by the first active gateway node over the period of time.

13. The system of claim 10, wherein the first active gateway node is configured to deny the API request if the total distance for the gateway cluster is greater than the predetermined threshold distance.

14. The system of claim 10, wherein the gateway cluster is configured to deny the API requests for the plurality of active gateway nodes in the gateway cluster if the first acceleration rate of the first subset of the API requests for the first active gateway node exceeds a predetermined acceleration threshold.

15. The system of claim 10, wherein the at least one processor is further configured to:
asynchronously send the first velocity and the first acceleration rate of the first subset of the API requests distributed to the first active gateway node to the at least one of the remaining active gateway nodes in the gateway cluster,
wherein sending and receiving velocity and acceleration data occurs at a predefined frequency that is shorter than a specified time window for a rate limiting policy of the gateway cluster, and
wherein a distributed memory is used to share data across a plurality of gateway nodes in the gateway cluster.

16. A non-transitory computer-readable device having instructions stored thereon that, when executed by at least one computing device, cause the at least one computing device to perform operations comprising:
calculating, upon receipt of an application programming interface (API) request by a first active gateway node within a gateway cluster having a plurality of active gateway nodes, a first velocity and a first acceleration rate of a first subset of API requests distributed to the first active gateway node;
calculating, by the first active gateway node, a total distance for the plurality of active gateway nodes in the gateway cluster by at least summing a first distance for the first active gateway node based on the first velocity and the first acceleration rate with a second distance based on a second velocity and a second acceleration rate of a second subset of the API requests distributed to at least one remaining active gateway node in the gateway cluster; and
allowing or denying, by the first active gateway node, the API request to be processed based on determination comparison of the total distance to a predetermined threshold distance; and
transmitting, to the at least one of the remaining active gateway nodes in the gateway cluster by the first active gateway node, the first velocity and the first acceleration rate of the API requests associated with the first active gateway node,
wherein the first velocity and the first acceleration rate of the first subset of the API requests are usable, by the at least one of the remaining active gateway nodes in the gateway cluster, to allow or deny another API request to be processed.

17. The non-transitory computer-readable device of claim 16, wherein:
the total distance for the gateway cluster is indicative of the total number of API requests processed by the plurality of active gateway nodes in the gateway cluster during a specified time window,
the predetermined threshold distance is a distributed quota for the gateway cluster determined by a rate limiting policy defining how many API requests can be processed by resources in an API environment during the specified time window, and
the first active gateway node is configured to deny the API request if the total distance for the gateway cluster is greater than the predetermined threshold distance.

18. The non-transitory computer-readable device of claim 16, wherein the calculated first velocity is indicative of a rate of API requests received by the first active gateway node during a period of time, and
wherein the calculated first acceleration rate of the first subset of the API requests is indicative of a change in the first velocity of the first subset of the API requests received by the first active gateway node over the period of time.

19. The non-transitory computer-readable device of claim 16, the operations further comprising:
asynchronously sending the first velocity and the first acceleration rate of the first subset of the API requests distributed to the first active gateway node to the at least one of the remaining active gateway nodes in the gateway cluster,
wherein sending and receiving velocity and acceleration data occurs at a predefined frequency that is shorter than a specified time window for a rate limiting policy of the gateway cluster, and
wherein a distributed memory is used to share data across a plurality of gateway nodes in the gateway cluster.

* * * * *

UNITED STATES PATENT AND TRADEMARK OFFICE
CERTIFICATE OF CORRECTION

| | | |
|---|---|---|
| PATENT NO. | : 12,393,414 B2 | Page 1 of 1 |
| APPLICATION NO. | : 17/949133 | |
| DATED | : August 19, 2025 | |
| INVENTOR(S) | : Bispo et al. | |

It is certified that error appears in the above-identified patent and that said Letters Patent is hereby corrected as shown below:

On the Title Page

Column 1, Item (72), in "Inventors", Line 3, delete "(AZ);" and insert -- (AR); --, therefor.

Column 1, Item (72), in "Inventors", Line 3, delete "Beunos" and insert -- Buenos --, therefor.

Column 2, Item (57), in "Abstract", Line 9, delete "time" and insert -- time to --, therefor.

In the Claims

In Column 11, Claim 1, Line 39, delete "and;" and insert -- and --, therefor.

Signed and Sealed this
Twenty-first Day of October, 2025

John A. Squires
*Director of the United States Patent and Trademark Office*